United States Patent
Kikuchi

(10) Patent No.: US 7,536,035 B2
(45) Date of Patent: May 19, 2009

(54) OBJECT VELOCITY MEASURING APPARATUS AND OBJECT VELOCITY MEASURING METHOD

(75) Inventor: Minoru Kikuchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/774,228

(22) Filed: Jul. 6, 2007

(65) Prior Publication Data

US 2008/0013791 A1    Jan. 17, 2008

Related U.S. Application Data

(62) Division of application No. 10/629,632, filed on Jul. 30, 2003.

(30) Foreign Application Priority Data

Sep. 19, 2002    (JP) .............................. 2002-273686

(51) Int. Cl.
*G06K 9/00*    (2006.01)
(52) U.S. Cl. ...................... 382/107; 382/106; 382/288; 382/291
(58) Field of Classification Search ......... 382/106–107, 382/288, 291
See application file for complete search history.

(56) References Cited

U.S. PATENT DOCUMENTS 6,167,143 A    12/2000  Badique

| 6,400,830 | B1 | 6/2002 | Christian et al. |
| 6,766,059 | B1 | 7/2004 | Kondo |
| 2004/0028287 | A1 | 2/2004 | Kondo et al. |

FOREIGN PATENT DOCUMENTS

| JP | 5-284501 | 10/1993 |
| JP | 6-331380 | 12/1994 |
| JP | 2002-190027 | 7/2002 |
| WO | WO 02067200 | 8/2002 |

OTHER PUBLICATIONS

Machine Translation of Japanese Pub No. 05-284501.*
Kikuchi et al., "Moving Target Detection from Infrared Images Using Genetic Algorithms", Systems and Computers in Japan, Vol. 34 No. 7, 2003.

* cited by examiner

*Primary Examiner*—John B Strege
(74) *Attorney, Agent, or Firm*—Oblon, Spivak, McClelland, Maier & Neustadt, P.C.

(57) ABSTRACT

An object velocity measuring apparatus of this invention for measuring an object velocity in a photographic field from a plurality of photographic frames made up of a plurality of pixels comprises an object area extracting unit configured to extract, as an object area, a set of pixels from which an object has been sensed over at least M (M<N) of N successive frames including the present frame, a center-of-gravity computing unit configured to calculate the center-of-gravity position coordinates of the extracted object area in the photographic field, and a velocity computing unit configured to calculate the object velocity from the movement of the calculated center-of-gravity position coordinates between different frames.

10 Claims, 5 Drawing Sheets

Image in X-th frame (present frame)

Image in (X-1)-th frame

Image in (X-(N-1))-th frame

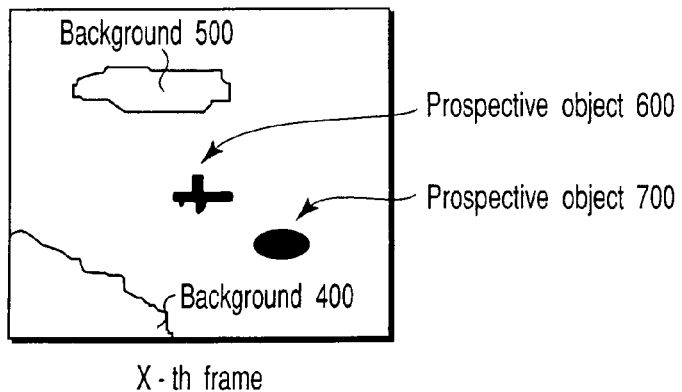
FIG. 4A — X-th frame
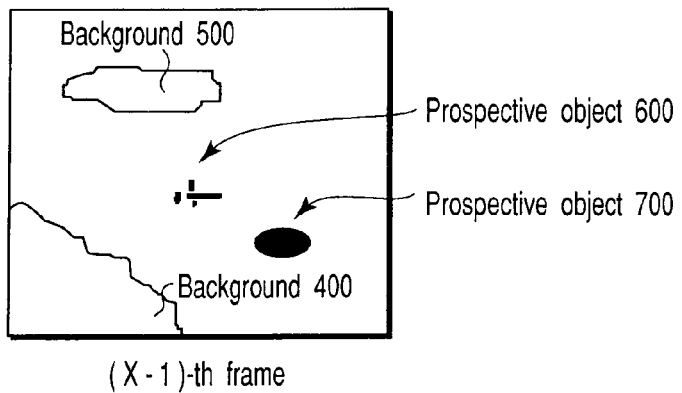
FIG. 4B — (X-1)-th frame
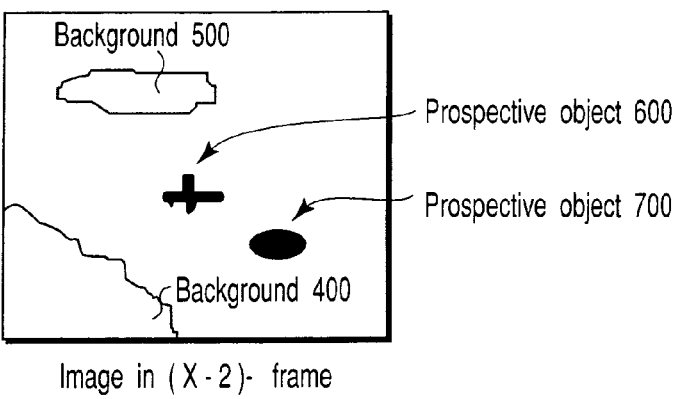
FIG. 4C — Image in (X-2)- frame
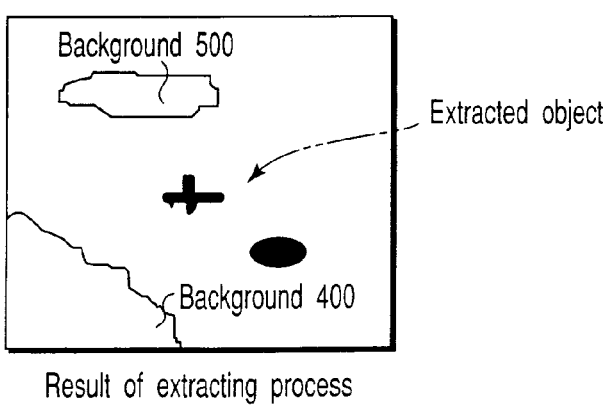
FIG. 4D — Result of extracting process Image in X-th frame (image in present frame)

Image in (X-1)-th frame (separated into segments)

OBJECT VELOCITY MEASURING APPARATUS AND OBJECT VELOCITY MEASURING METHOD

CROSS-REFERENCE TO RELATED APPLICATIONS

This application is a divisional of U.S. application Ser. No. 10/629,632 filed Jul. 30, 2003, and is based upon and claims the benefit of priority from the prior Japanese Patent Application No. 2002-273686, filed Sep. 19, 2002, the entire contents of each of which are incorporated herein by reference.

BACKGROUND OF THE INVENTION

1. Field of the Invention

The present invention relates to an object velocity measuring apparatus and an object velocity measuring method. More particularly, this invention relates to an object velocity measuring apparatus and an object velocity measuring method which extract an object from a video image and measure the two-dimensional moving velocity of the object in the photographic field. The velocity in the photographic field may be called the angular velocity. The image is photographed with an imaging device.

2. Description of the Related Art

This type of apparatus is applied to a surveillance camera, an object tracking apparatus, and the like. The parameters characterizing an object include the moving velocity of the video image (hereinafter, referred to as the object velocity) on the screen. A first known approach of measuring the object velocity is to subject the image to a motion vector process, such as block matching, thereby measuring the object velocity from the image. A second known approach is to measure a change in the object position coordinates for each frame, while correlating the object positions between a plurality of successive image frames and calculate the object velocity from the measured value.

With the first approach, however, when the size of the object in the image is small, it is difficult to sense the area where the object moves. Furthermore, since the first approach is based on block matching, the velocity measuring accuracy is limited to blocks (that is, pixels) at best.

On the other hand, since the surroundings of the imaging device vary severely outdoors, the signal component of the object in the image decreases or the noise component increases, which can prevent the object from being sensed temporarily. In this case, it is difficult to correlate the object positions between the frames. Moreover, parts of the object area extracted from the image can be separated from or connected to one another on a frame basis. In this case, it is difficult to correlate segments between a plurality of frames. Under such circumstances, the second approach is particularly unsuitable for measuring the object velocity outdoors.

As described above, since the existing approaches have a limit to the object velocity sensing accuracy, an approach capable of measuring the object velocity with still higher accuracy has been desired. Furthermore, in a state where the surroundings vary seriously, the object velocity sometimes cannot be sensed. Therefore, there has been a need to provide a approach of measuring the velocity in a robust manner.

BRIEF SUMMARY OF THE INVENTION

It is, accordingly, an object of the present invention to provide an object velocity measuring apparatus and an object velocity measuring method which are capable of measuring the velocity of an object in a robust manner with high accuracy.

The foregoing object is accomplished by providing an object velocity measuring apparatus for measuring an object velocity in a photographic field from a plurality of photographic frames made up of a plurality of pixels, the object velocity measuring apparatus comprising: an object area extracting unit configured to extract, as an object area, a set of pixels from which an object has been sensed over at least M ($M<N$) of N successive frames including the present frame; a center-of-gravity computing unit configured to calculate the center-of-gravity position coordinates of the extracted object area in the photographic field; and a velocity computing unit configured to calculate the object velocity from the movement of the calculated center-of-gravity position coordinates between different frames.

With this configuration, a set of pixels from which the object has been sensed in at least M, not all, of the N frames ($M<N$) from the present frame is extracted as an object area. M frames are not necessarily successive in time. This makes it possible to execute the process continuously even when the object disappears temporarily from the video images, which realizes a robust process. Furthermore, in the present invention, the center of gravity of the object area is determined. From the movement of the determined center of gravity, the object velocity is calculated. Since the center-of-gravity position coordinates of the object area are calculated on an order smaller than the size of a pixel, the accuracy of the processing is improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A to 4D are drawings to help explain the effect produced by the process of the extract processor 1b in FIG. 2;

DETAILED DESCRIPTION OF THE INVENTION

Figure 1:
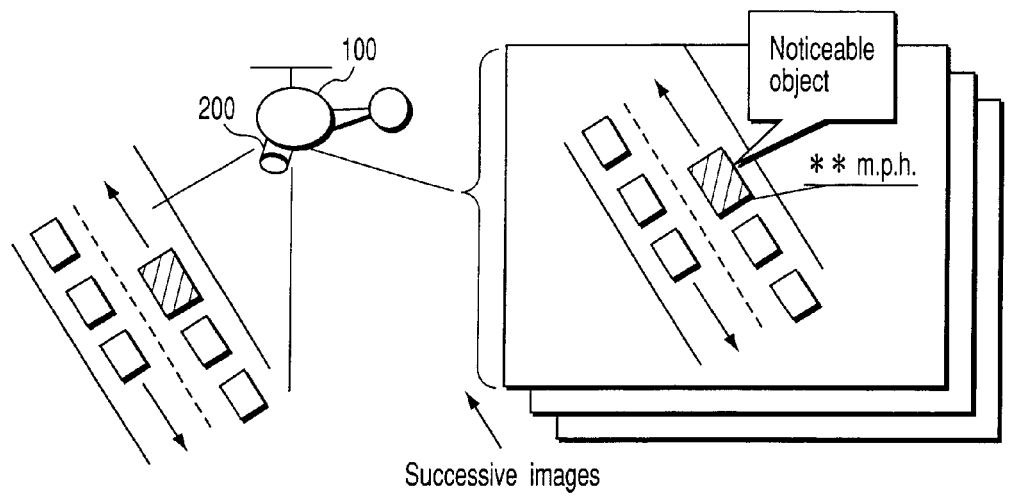
FIG. 1 is a view showing an embodiment of a system to which an object velocity measuring apparatus according to the present invention is applied.

FIG. 1 is a view showing an embodiment of a system to which an object velocity measuring apparatus according to the present invention is applied. In the system, a video camera 200 installed in an airplane 100 photographs vehicles running on the road. The video camera 200 outputs images successive in time. After a noticeable object is set in each image, the moving velocity of the object in the photographic field is determined. On the basis of the moving velocity of the object and the altitude (or photographic altitude) of the airplane 100, the running velocity of a vehicle on the road can be calculated. The calculated velocity corresponds to the relative velocity between the airplane 100 and the vehicle. When the flying velocity of the airplane 100 is known, the moving velocity (or running velocity) of a movable body can be calculated. The object velocity measuring apparatus related to the present invention is used to calculate the moving velocity of the object in the photographic field.

Figure 2:
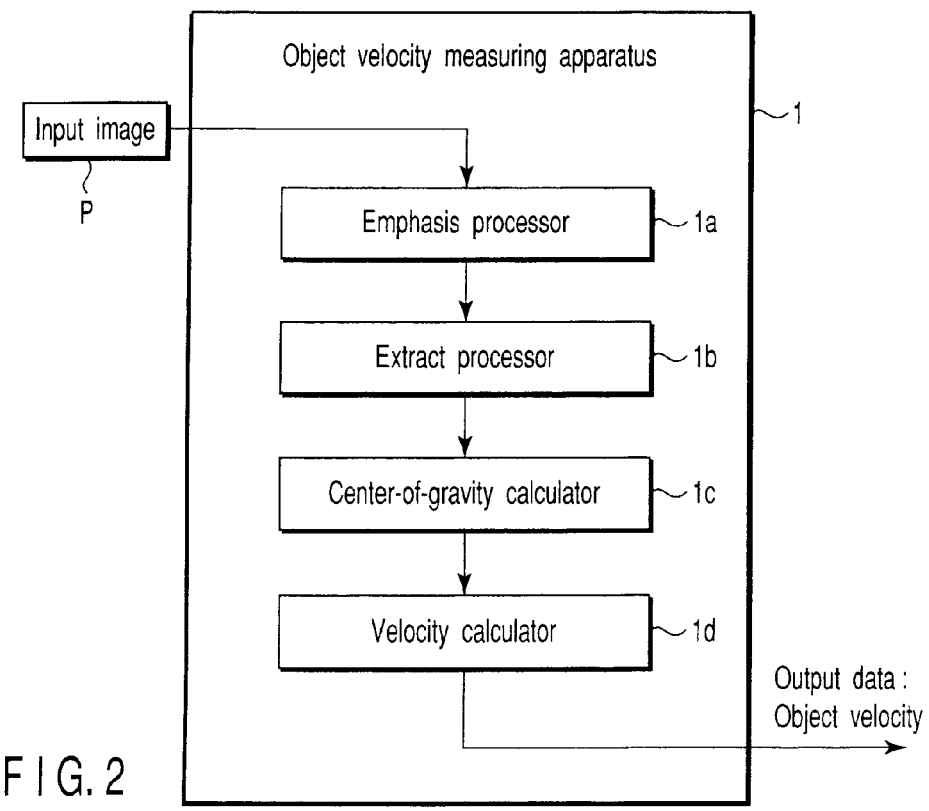
FIG. 2 is a functional block diagram of the embodiment of the object velocity measuring apparatus 1 related to the present invention.

FIG. 2 is a functional block diagram of the embodiment of the object velocity measuring apparatus 1 according to the present invention. The object velocity measuring apparatus 1 comprises an emphasis processor 1a, an extract processor 1b, a center-of-gravity calculator 1c, and a velocity calculator 1d.

In FIG. 2, the emphasis processor 1a acquires input images 300 photographed at a specific frame rate from the video camera 200. Each input image 300 is made up of a plurality of pixels. The emphasis processor 1a compares the luminance of each pixel of the input image 300 with a specified threshold value, thereby binarizing each pixel. Then, the contrast-emphasized image is supplied to the extract processor 1b.

The extract processor 1b extracts an object area from the binarized image. Specifically, of the input images 300 inputted one after another, the extract processor 1b accumulates N successive frames including the present frame in an image memory (not shown) or the like. Then, of the pixels constituting the accumulated image data, the extract processor 1b determines the pixels for which the object has been sensed over at least M frames (M<N). The extract processor 1b extracts, as an object area, a set of pixels for which the object has been sensed over M frames.

The center-of-gravity calculator 1c computes the center-of-gravity position coordinates of the extracted object area in the photographic field. When the object area corresponding to the same object is separated into a plurality of segments, the center-of-gravity calculator 1c first determines the area of and the center-of-gravity position coordinates of each segment. Then, the center-of-gravity calculator 1c calculates the weighted mean of the center-of-gravity coordinates of each segment, using the area of each segment in the photographic field as a weight. In this way, the center-of-gravity calculator 1c calculates the center-of-gravity coordinates of the object area including the separated segments.

The velocity calculator 1d calculates the movement of the center-of-velocity position coordinates of each object area per an unit of time (or for each frame). The calculated value is the object velocity in the photographic field. The object velocity is output as output data.

Figure 3A:
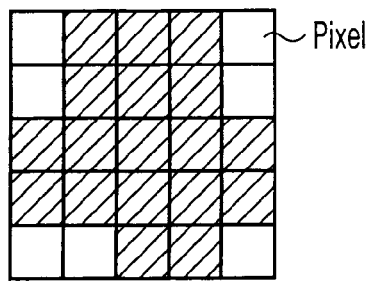
FIGS. 3A to 3D are drawings to help explain the process of the extract processor 1b shown in FIG. 2.

FIGS. 3A to 3D are drawings to help explain the process of the extract processor 1b. As shown in FIG. 3A, it is assumed that the present photographic frame (present frame) appears in the position of an X-th frame. Each frame is made up of a plurality of pixels. Of the pixels, the hatched ones correspond to the pixels from which the object has been extracted.

Figure 3B:
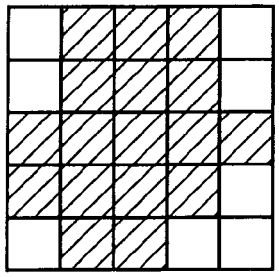
Figure 3C:
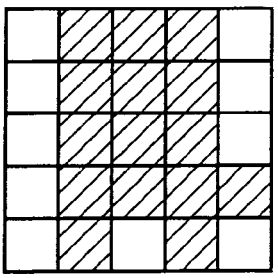

The frame immediately before this frame is in the position of an (X−1)-th frame as shown in FIG. 3B. In this way, the image data in N successive frames (N is a natural number) from the present frame is used in the processing. As shown in FIG. 3C, the one N frames in time before the X-th frame is in the position of an (X−(N−1))-th frame.

Figure 3D:
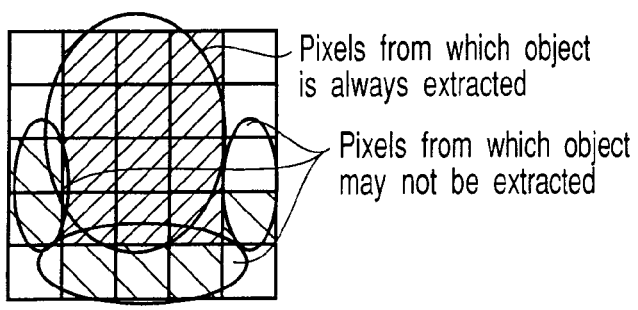

The images in FIGS. 3A to 3C show those of different shapes. That is, as shown in FIG. 3D, there are pixels from which the object is always extracted, pixels from which the object may not be extracted, and pixels from which the object is never extracted.

The extract processor 1b counts the number of times the object is extracted for each pixel. When the count has reached the number M (M is a natural number smaller than N) whose ratio to N is a specific value, the extract processor 1b considers that the object has been extracted from the pixels. Then, the extract processor 1b gives a set of pixels from which the object has been extracted as the object area to the center-of-gravity calculator 1c.

FIGS. 4A to 4D are drawings to help explain the effect produced by the process of the extract processor 1b. In FIGS. 4A to 4D, let N=3 and M=2. In each frame of FIGS. 4A to 4C, background images 400 and 500 and prospective objects 600 and 700 as mobile objects are shown. FIGS. 4A to 4C show frames successive in time. In the frame of FIG. 4B, the image of prospective object C is broken temporarily due to electromagnetic noise or the irregular reflection of infrared rays. Thus, as far as the frame of FIG. 4B is concerned, it is assumed that the object image has not been extracted.

However, in the other frames (FIGS. 4A and 4C), clear images have been obtained. That is, in two of the three frames, prospective object C can be extracted. Thus, as shown in FIG. 4D, the prospective object 600 is regarded as the object. Accordingly, both of the prospective objects 600 and 700 are used in the center-of-gravity computing process.

As described above, even if the object image cannot be extracted temporarily, when the object image can be extracted from at least two of the three frames, the image of the prospective object can be extracted. As a result, in the embodiment, a process more immune to noise and disturbance can be carried out.

Figure 5A:
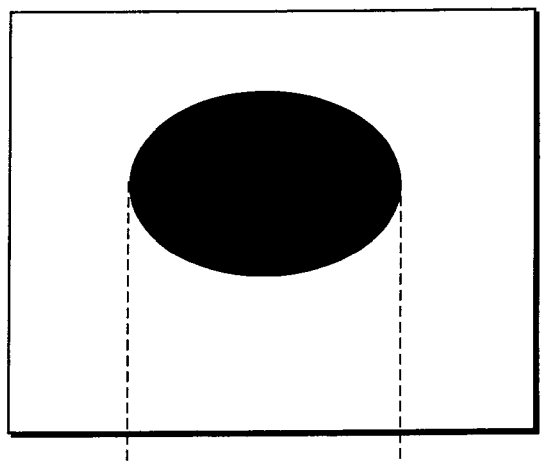
FIGS. 5A and 5B are drawings to help explain the process of the center-of-gravity calculator 1c shown in FIG. 2.
Figure 5B:
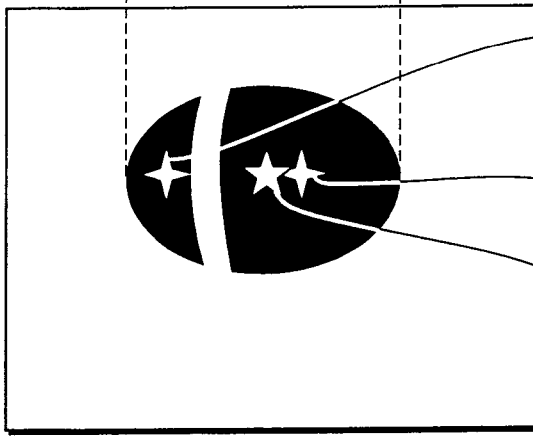

FIGS. 5A and 5B are drawings to help explain the process of the center-of-gravity calculator 1c. The object area shown in FIG. 5A has been extracted in the form of a set of pixels put together, without being separated into segments. In FIG. 5B, however, the object area has been separated into two segments.

In the embodiment, the center of gravity of all the separated areas is determined. Then, the coordinates of the center of gravity are tracked, thereby calculating the velocity of the object. To find the center of gravity of all the separated areas, the center-of-gravity position coordinates of and the area of each segment are determined. Then, the weighted mean of the center-of-gravity position coordinates of each segment is calculated, using the area of each segment as a weight. As a result, the center-of-gravity position coordinates as a whole are found.

The center-of-gravity position vector $G_{TOTAL}$ as a whole is calculated using the following equation (1) in the embodiment. In equation (1), G1 is the center-of-gravity position coordinate vector of segment 1, S1 is the area of segment 1, G2 is the center-of-gravity position coordinate vector of segment 2, and S2 is the area of segment 2 in FIG. 5B:

$$G_{TOTAL} = \frac{G1 \cdot S1 + G2 \cdot S2}{S1 + S2} \quad (1)$$

In calculation using equation (1), the difference between the center-of-gravity position of each segment and the center-of-gravity position of all the segments is inversely proportional to the area of the segment. Specifically, in FIG. 5B, S2 (the area of segment 2) is greater than S1 (the area of segment 1). Thus, in inverse proportion to this, the gap between G1 and $G_{TOTAL}$ is smaller than the gap between G2 and $G_{TOTAL}$. That is, $G_{TOTAL}$ locates closer to G2 than G1.

As described above, in the embodiment, the number of times the object is extracted is counted for each of the pixels in the photographic frame whose contrast is emphasized by a binarizing process. Of the N successive frames before the present frame, a set of pixels sensed at least M times (M<N) is extracted as the object area. Then, the center-of-gravity position coordinates of the extracted object area are calculated. From the movement of the center-of-gravity position coordinates between frames, the object velocity in the photographic field is calculated. Furthermore, in the embodiment, when the object area corresponding to the same object is separated into a plurality of segments, the weighted mean of the center-of-gravity position coordinates of each segment is calculated using the area of the segment as a weight. Then, the center-of-gravity position coordinates of the object area made up of the separated segments are found.

As described above, the center-of-gravity position coordinates of the object area extracted by an adaptive binarizing process are determined. Changes in the determined center-of-gravity position coordinates are measured, thereby calculating the object velocity with high accuracy. Once the object velocity in the field is found, the resulting value is multiplied by the distance to the object, thereby calculating the actual moving velocity (referred to as speed data) of the object.

Determining the center of gravity of the object area enables the coordinates to be calculated with an accuracy of the size of a pixel or smaller. Thus, high accuracy is achieved. In addition, there is no limit to the size of a segment, which enables a small object to be dealt with sufficiently.

The aforementioned process has the advantage that the obtained velocity data is not influenced by the distance to the object, provided that the size of the object and the velocity are the same. Specifically, although the object velocity is higher as the object is nearer, the size of the object in the field is also larger. Conversely, although the object is photographed as a smaller object as the object is farther away, the velocity in the field is also lower. That is, since the size of the photographed object and the velocity are both inversely proportional to the distance, the accuracy of the velocity is not influenced by the distance.

As described above, in the embodiment, a set of pixels from which the object has been sensed over at least M (M<N) of the N successive frames is set as the object area. This enables the object velocity to be measured in a robust manner immune to noise and disturbance from unstable signal components like images photographed outdoors. Furthermore, the center of gravity of the object area is calculated. From the resulting value, the velocity is found, which makes it possible to measure the object velocity of a small object (e.g., a person or car) in the moving picture with high accuracy. Accordingly, it is possible to measure the object velocity in a robust manner with high accuracy.

The present invention is not limited to the above embodiment.

Figure 6:
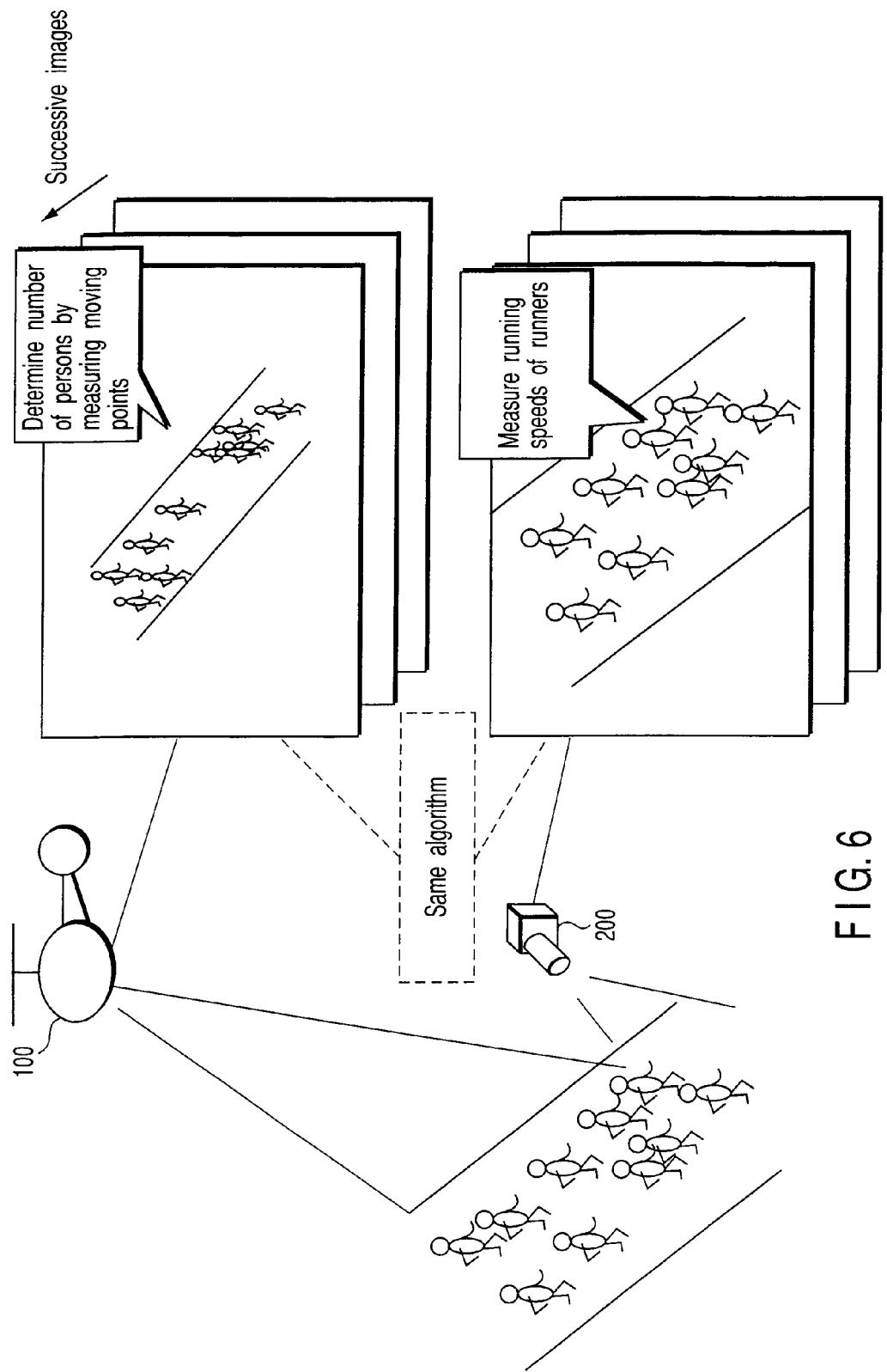
FIG. 6 is a view showing another embodiment of the system to which the object velocity measuring apparatus according to the present invention is applied.

FIG. 6 is a view showing another embodiment of the system to which the object velocity measuring apparatus of the present invention is applied. FIG. 6 shows an example where the object velocity measuring apparatus of the invention is used to determine the distribution of runners in a marathon. In a marathon, individual runners and a group of runners are noticeable objects. Each moving point is extracted from the images photographed with the video camera installed in the airplane 100. Then, each moving point is identified, thereby determining the number of runners. Moreover, a video camera 200 may be fixed on a pedestrian overpass and the running speed of each runner may be measured from the video images. These processes can be carried out by using the same known algorithm. As described above, the object velocity measuring apparatus of the embodiment may be applied to fixed point observation.

The values of N and M in the extract processor 1b of FIG. 2 may not be fixed. That is, the values of N and M may be varied adaptively according to the object velocity data, the size of the object area in the photographic field, the frame rate, or the like. In short, if M<N, the object of the present invention is achieved. The values of N and M may be varied in the range fulfilling the condition.

Furthermore, in the embodiment, when the center of gravity of all the separated areas is determined, the area of each segment is found. Instead of this, the number of pixels in each segment may be counted.

In addition, even when the object area is separated into three segments or more, the center of gravity can be calculated using the weighted mean. If the number of separated segments is n, the area of each segment is Si (i=1 to n), the center-of-gravity position vector of each segment is Gi, the center-of-gravity position vector $G_{TOTAL}$ as a whole is expressed by the following equation (2):

$$G_{TOTAL} = \frac{\sum_{i=1}^{n} G_i \cdot S_i}{\sum_{i=1}^{n} S_i} \quad (2)$$

Additionally, this invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object velocity measuring apparatus for measuring an object velocity in a photographic field from a plurality of photographic frames made up of a plurality of pixels, the object velocity measuring apparatus comprising:

an object area extracting unit configured to extract, as an object area, a set of pixels from which an object has been sensed over at least M (M<N) of N successive frames including the present frame;

a center-of-gravity computing unit configured to calculate the center-of-gravity position coordinates of the extracted object area in the photographic field; and a velocity computing unit configured to calculate the object velocity from the movement of the calculated center-of-gravity position coordinates between different frames, wherein the center-of-gravity computing unit, when the object area corresponding to the same object is separated into a plurality of segments, calculates the weighted mean of the center-of-gravity position coordinates of each segment, using the area of each segment in the photographic field as a weight, and determines the center-of-gravity position coordinates of the object area in the photographic field.

2. The object velocity measuring apparatus according to claim 1, wherein the object area extracting unit varies at least one of N and M adaptively according to at least one of the object velocity, the size of the object area in the photographic field, and the frame rate of the photographic frames.

3. The object velocity measuring apparatus according to claim 1, further comprising a binarizing unit configured to binarize each pixel in the photographic frames on the basis of a specified threshold value related to its luminance.

4. The object velocity measuring apparatus according to claim 1, wherein the photographic frames are photographed with an imaging device installed on a movable body, and the velocity computing unit multiplies the object velocity by the distance between the imaging device and the object, thereby calculating a relative velocity between the imaging device and the object.

5. The object velocity measuring apparatus according to claim 1, wherein the photographic frames are photographed with an imaging device fixed in position, and the velocity computing unit multiplies the object velocity by the distance between the imaging device and the object, thereby calculating a relative velocity between the imaging device and the object.

6. An object velocity measuring method of measuring an object velocity in a photographic field from a plurality of photographic frames made up of a plurality of pixels, the object velocity measuring method using a processor to carry out the steps of:

a first step of extracting, as an object area, a set of pixels from which an object has been sensed over at least M (M<N) of N successive frames including the present frame;

a second step of calculating the center-of-gravity position coordinates of the extracted object area in the photographic field; and a third step of calculating the object velocity from the movement of the calculated center-of-gravity position coordinates between different frames, wherein the second step is a step which, when the object area corresponding to the same object is separated into a plurality of segments, calculates the weighted mean of the center-of-gravity position coordinates of each segment, using the area of each segment in the photographic field as a weight, and determines the center-of-gravity position coordinates of the object area in the photographic field.

7. The object velocity measuring method according to claim 6, further comprising a fourth step of varying at least one of N and M adaptively according to at least one of the object velocity, the size of the object area in the photographic field, and the frame rate of the photographic frames.

8. The object velocity measuring method according to claim 6, further comprising a fifth step of binarizing each pixel in the photographic frames on the basis of a specified threshold value related to its luminance.

9. The object velocity measuring method according to claim 6, wherein the photographic frames are photographed with an imaging device installed on a movable body, and the object velocity measuring method further comprises a sixth step of multiplying the object velocity by the distance between the imaging device and the object, thereby calculating a relative velocity between the imaging device and the object.

10. The object velocity measuring method according to claim 6, wherein the photographic frames are photographed with an imaging device fixed in position, and the object velocity measuring method further comprises a seventh step of multiplying the object velocity by the distance between the imaging device and the object, thereby calculating a relative velocity between the imaging device and the object.

* * * * *